United States Patent [19]
McCulloch et al.

[11] Patent Number: 5,888,927
[45] Date of Patent: Mar. 30, 1999

[54] CHIRAL SEPARATION USING A UNIMODAL, LARGE-PORE SILICA AS THE SUPPORT

[75] Inventors: Beth McCulloch, Clarendon Hills; Timothy A. Brandvold, Buffalo Grove; Peter K. Nickl, Des Plaines; Jennifer S. Holmgren, Bloomingdale; Joseph J. Alcaraz, Des Plaines, all of Ill.

[73] Assignee: Uop LLC, Des Plaines, Ill.

[21] Appl. No.: 889,809

[22] Filed: Jul. 8, 1997

[51] Int. Cl.[6] .............................. B01J 20/12; B01J 31/00; C01B 33/12; B32B 5/16
[52] U.S. Cl. ..................... 502/407; 502/411; 502/159; 502/169; 502/172; 502/224; 502/232; 502/233; 502/243; 502/507; 423/335; 428/403; 428/407
[58] Field of Search ...................... 502/407, 411, 502/159, 169, 172, 224, 232, 233, 243, 507; 423/335; 428/403, 407

[56] References Cited

U.S. PATENT DOCUMENTS

| | | | |
|---|---|---|---|
| 3,826,755 | 7/1974 | Grimes et al. ..................... | 252/301.1 |
| 4,617,060 | 10/1986 | Dreibelbis ........................... | 106/193 R |
| 4,619,970 | 10/1986 | Okamoto et al. .................... | 525/100 |
| 4,783,435 | 11/1988 | Dreibelbis .......................... | 502/214 |
| 4,818,394 | 4/1989 | Okamoto et al. ................... | 210/198.2 |
| 4,937,394 | 6/1990 | Dreibelbis .......................... | 568/896 |
| 5,102,676 | 4/1992 | Aldcroft et al. ..................... | 426/423 |
| 5,202,104 | 4/1993 | Watanabe et al. ................... | 423/335 |
| 5,637,636 | 6/1997 | Cartwright et al. ................. | 524/493 |
| 5,747,003 | 5/1998 | Mohnot et al. ...................... | 424/49 |

*Primary Examiner*—Mark L. Bell
*Assistant Examiner*—Patricia L. Hailey
*Attorney, Agent, or Firm*—Thomas K. McBride; Frank S. Molinaro

[57] ABSTRACT

Chiral stationary phases perform well when the underlying support for the chiral organic material is coated onto a silica pore widened by a hydrothermal treatment. The resulting silica is amorphous with a unimodal distribution of large pores. A variety of chiral stationary phases perform well and are distinguished, inter alia, by the treatment, if any, prior to coating the chiral organic material.

8 Claims, No Drawings

CHIRAL SEPARATION USING A UNIMODAL, LARGE-PORE SILICA AS THE SUPPORT

This invention pertains to large-pore silicas as the support for chiral stationary phases. More particularly, this invention relates to separations of chiral materials using a chiral organic phase deposited on silicas having a pore size in the 300–25,000 angstrom range. With even greater particularity, our invention relates to chiral stationary phases (CSPs) where the support is a large-pore silica having pores of the aforementioned size range with the pore size having a unimodal distribution. With still greater particularity the subject matter of this application pertains to chiral stationary phases whose support is a hydrothermally treated silica having large pores in the aforementioned size range and a unimodal size distribution.

BACKGROUND OF THE INVENTION

Silica long has been used, either per se or coated with an organic material, as a stationary phase in chromatography, and as such has enjoyed broad success and applicability. As new chromatographic needs arose, these often were met by changing the properties of silica, so that several discrete kinds of silica have been used as a stationary phase. For example, Okamoto and his group recently have described chiral stationary phases, i.e., stationary phases coated with a chiral organic material and used in the chromatographic separation of racemic mixtures to afford chiral components, and has found that such separations are effected particularly well using large-pore silica as a support, i.e., silica having pores on the order of 300–1,000 angstroms. See, for example, Y. Okamoto and Y. Kaida, *J. Chromatography A,* 666 (1994) 403–419.

Silicas containing large pores are available, but routes to their preparation result in high cost, low reproducibility, and limited availability. For example, a pore-filling/melt procedure has been successfully used to prepare large-pore silica with pore sizes 1,000 angstroms and greater. In this procedure silica is impregnated with a salt, such as sodium chloride, by an incipient wetting technique, so the pores are filled with a solution of sodium chloride. The wetted materials are carefully dried, then heated to a temperature where sodium chloride liquefies and the pore structure of silica is disrupted. Upon cooling, the silica recrystallizes around the salt, generating pores within the bulk silica of large size ($\geq 1,000$ angstrom pores). Subsequently the salt is washed out to leave silica having the aforementioned large-pore structure.

It has been observed that the silicas prepared by the foregoing method have a bimodal pore distribution. We also have observed that the silicas resulting from the aforedescribed procedure have little, if any, silanol functionality, which we believed would be important where silica is used as a support for an organic coating. The aforegoing observation is reasonable given the high calcination temperatures used. Last, the method is difficult to apply in making commercial sized batches.

What we believed necessary as a support for CSPs was a silica having large pores (at least 1,000 angstroms) with a narrow pore size distribution, a relatively low surface area (20–30 meters per square gram ($m^2/g$)) and particles at least within the 50–150 micron range to accommodate commercial-size separations, particularly by simulated moving bed chromatography. It was required of any method of making such materials that the method be readily adaptable to commercial-size runs, that it afford control over pore size so as to give a reproducible pore size and distribution, that it was applicable to silicas generally, and that it was relatively inexpensive and did not require specialized equipment or a severe heat treatment. It was further required that such material be an acceptable support for a broad spectrum of chiral organic materials currently used as the coating in a CSP; in short, we sought a silica which could be substituted for existing silicas to give a CSP at least as effective as prior art materials.

What we have found is that when silica is contacted with a mineralizing agent in the temperature range of 85°–300° C. for a time as short as four hours and up to several days, one introduces into the silica large pores with a unimodal size distribution. This offers a general route to large pore silicas whose pore size can be readily controlled; the preparative method can be practiced effectively without specialized equipment, avoids the high temperatures of prior art methods, and is readily practiced on a large, commercial scale. We have further observed that CSPs based on such silicas as the support often function even more effectively than CSPs made with prior art silicas and provide more cost-effective separations because of the more economical support.

SUMMARY OF THE INVENTION

The purpose of our invention is to make available chiral stationary phases which are effective in the large-scale separation of chiral materials where the support is an amorphous, large-pore silica having pores in the 300–25,000 angstrom range with a unimodal distribution of the large pores. An embodiment is a chiral stationary phase comprising a chiral organic material impregnated on an amorphous silica with a surface area no greater than about 30 $m^2/g$, and having a unimodal distribution of pores in the 300–25,000 angstrom range. In a more specific embodiment the chiral organic material is an ester or carbamate of a polysaccharide. In another specific embodiment, the silica is of a particle size larger than about 35 microns. In a still more specific embodiment, the chiral organic material is a cellulose ester or carbamate on a large-pore silica with a particle size greater than about 50 microns. Other aspects and embodiments of our invention will be clear from our ensuing description.

DESCRIPTION OF THE INVENTION

Our invention is a chiral stationary phase of a chiral organic material coated or impregnated on an amorphous, large-pore silica of surface area less than about 30 $m^2/g$ and having a unimodal pore size distribution with pores in the size range 300–25,000 angstroms, at least about 10% of Q3 silanols as measured by nuclear magnetic resonance spectroscopy, and less than about 0.5% of Q2 silanols as measured by NMR spectroscopy. Although there are prior art methods available to afford large-pore silicas, the pore size distribution in such materials is bimodal and the silicas have much less than 10% Q3 silanols. We have observed that when a silica is contacted with a mineralizing agent in the temperature range of 85°–300° C. for times varying between 4 hours and perhaps as long as 10 days, the resulting silica has pores in the 300–25,000 angstrom range with low surface area and with the silica in an amorphous state. The advantages of the silicas prepared above as a support in CSPs are that the large pores have a unimodal distribution, contrary to prior art materials, and there is a relatively high degree of control over the size of pores introduced.

Chromatographic processes, especially liquid chromatography, appear to offer the best prospects for chiral separations. One variant of the latter utilizes achiral eluants in combination with a chiral stationary phase, which has the critical aspect that a variety of chiral stationary phases be available to the practitioner. In recent years substantial progress has been made by developing a class of chiral stationary phases based upon derivatized polysaccharides, especially cellulose, adsorbed on a carrier or support. This recently has been summarized by Y. Okamoto, *J. Chromatog.*, 666 (1994) 403–19.

Although this class of chiral stationary phases shows excellent stability for an adsorbed chiral organic material, nonetheless gradual dissolution of the chiral organic material does occur. Thus, one limitation of the prior art, polysaccharide chiral stationary phases, is that the chiral component is merely adsorbed on the carrier, which has the unavoidable consequence that the stationary phase itself may leach with appropriate solvents. The practical consequence of the chiral stationary phase bound solely by adsorption is to limit the range of solvents which may be used as eluants in the chromatographic resolution of racemates. This is an undesirable restriction which limits not only the flexibility of chromatography-based optical resolution but also substantially increases its cost through the gradual loss of expensive chiral stationary phase. Thus the need for a more "permanent" chiral stationary phase has been recognized and solutions for polysaccharide-based systems designed on a covalent tether anchoring the chiral stationary phase to the carrier has been disclosed. Y. Okamoto, et al., *J. Liq. Chromatog.*, 10 (1987), 1613–28; U.S. Pat. No. 4,619,970.

Our invention is intended to encompass chiral stationary phases having a chiral organic material merely adsorbed on its surface, as well as having a chiral organic material which is covalently bonded, however indirectly, to the underlying support. However, because the underlying support properties may be more important in those cases where the chiral organic material is merely adsorbed on the support, we place greater emphasis on this aspect of the invention.

Since the chiral organic materials used in chiral stationary phases are well known in the prior art, a detailed discussion and description is not necessary here. However, we note that chiral organic materials which are esters and carbamates of polysaccharides are of particular importance in the practice of our invention, if only because of the practicality of using them as the chiral material. Within this class, cellulose esters and carbamates are by far the most important. Analogous derivatives of amylose, chitosan, xylan, dextran, and inulin are representative of other polysaccharides which have been so used.

The chiral organic material is adsorbed on the silica support, usually by contacting the silica with a suitable solution of the chiral organic materials, for example, the polysaccharide ester or carbamate. The support can be "passivated" by prior treatment with a suitable silane. This aspect of the procedure is well documented and need not be reviewed in any detail at this time; see, for example, Okamoto, et al., U.S. Pat. No. 4,818,394, for a representative procedure.

Turning to the nature of the silica used as the solid support, although the successful and effective practice of our invention is independent of any theory, we have developed an hypothesis which provides a convenient model within which the preparation and properties of the silica support are reasonably understood. We believe that the "mineralizing agents" act to disrupt the long-range order in silica. This is tantamount to dissolving some small fraction of silica so as to disrupt the bulk structure. Since there is only partial dissolution of silica, there also is continual reorganization and reconstruction of the silica framework. The extent to which one can dissolve and reconstruct silica is related to the rate of its dissolution and the rate of its reorganization. Consequently, both the amount of mineralizer and the history of the silica (e.g., its prior calcination temperature) are important in influencing the size of the pores introduced. Both can be viewed as means of controlling pore size; in general, the less severe the mineralization conditions, the smaller will be the pores introduced. It also follows from the foregoing model that as the temperature increases (increased severity of mineralization) the pore size will increase. We wish to emphasize that the method we practice affords control over the size of the pores formed, with a homogenous distribution of pores, without controlling the number of pores formed.

Our preparative approach is essentially a hydrothermal treatment of silica with a mineralizing agent. In summary, hydrothermal treatments are conveniently done at autogenous conditions. A slurry of the silica gel and a solution of a mineralizing agent is heated at 85°–300° C. for a time as short as about 4 hours up to perhaps as long as 10 days. The silica gel then is recovered from the cooled mixture and washed to afford the amorphous, large-pore silicas used as the support in the CSPs of our invention.

The nature of the silica which is mineralized is not critical but does affect the specific outcome. For example, silica which has been calcined at a high temperature is more resistant to mineralization than a silica calcined at a lower temperature, and consequently upon hydrothermal treatment will give smaller pore sizes, although still in the 300–25,000 angstrom range. Therefore, the specific pore size introduced in a given treatment depends on the nature of the silica treated, but the fact of large pore introduction does not depend on the nature of the silica. Generally, the silica is used as a 20–60 wt. % aqueous slurry, but this is a matter of convenience. The amount of silica present in the slurry is not a critical aspect of our preparation, nor does it affect the properties or outcome of the resulting silica in any significant fashion.

As mentioned above, the mineralizers of our invention perform the function of partially dissolving silica and thus disrupting the long-range order. It is the continuing process of partial dissolution followed by reorganization and reconstruction which leads to the introduction of large sized pores into silica. Consequently, any agent which successfully partially dissolves silica is a mineralizing agent in the context of our preparative method. Examples of mineralizing agents include inorganic anions of which hydroxide, carbonate, and fluoride are illustrative examples, as well as organic complexing agents such as diphenols (e.g., catechol) and amines (e.g., ethylenediamine, 2,2'-bipyridine), xanthates, ketones (e.g., acetylacetonate), and complexing agents having more than one functional group (e.g., ethylenediamine tetraacetic acid, nitrilotriacetic acid). The foregoing examples are merely illustrative rather than exhaustive; in general, suitable mineralizing agents will be well known to those practicing in the silica arts.

The mineralizing agents may be used in concentrations between about 0.2 up to about 11 weight percent. The particular concentration used will depend upon the nature of the mineralizer, the silica source, and pore size desired. In general, the stronger the mineralizing agent—i.e., the greater its capacity to partial dissolve silica—the lower its concentration for a given pore size-silica combination. Increasing pore size generally requires increasing concentration. Similarly, the more resistant the silica source to dissolution the greater the concentration of mineralizing agent. The foregoing are merely the logical consequences of silica dissolution by the mineralizing agents of our invention. The pH at which the mineralizing agents are contacted with silica will in large part depend upon the mineralizing agent itself. For example, where hydroxide and carbonate are the mineralizing agent, clearly the pH is rather basic. i.e., 9 or above. On the other hand, where fluoride is the mineralizing agent, it has been found convenient to perform mineralization at a pH in the range of 5.5 up to as high as about 6.5.

The silica is treated with the mineralizing agent at a temperature generally in the range of 85°–300° C. at autogenous pressure. Higher temperatures may be used in our preparation but these are generally not advantageous. The range between about 100 and about 200° C. is a preferred temperature range. The treating time may be as short as about 4 hours and may be as long as about 10 days. As previously mentioned, treating at higher temperatures and for longer times affords a silica with larger pores.

The silicas which are formed according to the preparative method described above are amorphous and often have a remarkably narrow unimodal pore size distribution. Specifically, the pore distribution generally is such that at least 50% of the pores are within 10% of the median pore size, and often within 50 angstroms of the median pore size. Thus, a silica characterized as having a median pore size of 1000 angstroms will have at least 50% of its pores within the range 900–1100 angstroms, and often within the range 950–1050 angstroms. The silicas also have a surface area not more than about 30 m$^2$/g with large pores in the size range of 300 up to about 25,000 angstroms although silicas with a median pore size in the range 800–10,000 angstroms are favored, and silicas with a median pore size of about 1000 angstroms seem most desirable. Quite importantly, the size of the large pores introduced is controllable, as described above, which is a unique advantage of our method. Also quite significantly, the silicas of our invention show only Q3 silanols as determined by nuclear magnetic resonance spectroscopy. That is, nuclear magnetic resonance spectroscopy can distinguish between the OH groups of different types of silanols; see "Solid State NMR for Chemists," Colin A. Fyfe, CFC Press, 1983, pp 337–61. "Q3 silanols" refers to the structure Si(OSi)$_3$(OH), whereas "Q2 silanols" refer to the OH in structures as Si(OSi)$_2$(OH)$_2$. That our silicas contain at least about 10%, and usually at least 13% Q3 silanols and under about 0.5% Q2 silanols is a clear differentiation from prior art silicas. This is significant, since the large-pore silica as prepared by the prior art pore-filled/melt method have no Q3 (or Q2) silanols, which is understandable given the high calcination temperatures endured by the materials. Thus, this is a clear differentiation between the silicas resulting from our method and that of the prior art large-pore silicas. The presence of Q3 silanols also is important since it is believed that a silanol OH group is important in subsequent binding of an organic coating to the silica when used as a support. Thus, not only is the silica used as a support clearly differentiated from that of the prior art, but the silica described above also is advantageous when used as a support in a chiral stationary phase based on chiral organic materials as coatings, the subject matter of our invention.

EXAMPLES

General Method of Preparation. All hydrothermal treatments were done at autogenous conditions. An aqueous slurry consisting of the silica gel (25–54% solids) and a solution containing a mineralizer were placed in a sealed 125 cc Parr reactor, which subsequently was placed in a forced air oven at 100°–200° C. for 4 hours up through several days under static conditions. The silica gel was recovered and washed by certrifugation or filtration.

For comparison, large-pore silica was prepared by the pore-filled/melt method following the procedure of I. Novak and D. Berek, *J. Chromatography A*, 665 (1994) 33–6. (NaCl, 800° C.).

The experimental variables in the preparation of the large-pore silicas of our invention are summarized in Table 1. Some important physical properties of these materials are summarized in Table 2.

TABLE 1

Sample Preparation of Hydrothermally Treated Silicas

| Sample | Wt % (slurry) | Mineralizing Ag & Conc | T(°C.) | t(days) |
|---|---|---|---|---|
| A | 54 | NaOH, Si/OH = 95 | 124 | 1 |
| B | 25 | NaOH, Si/OH = 95 | 151 | 1 |
| C | 54 | NaOH, Si/OH = 95 | 151 | 1 |
| D | 54 | NaOH, Si/OH = 95 | 200 | 1 |
| E | 54 | NaOH, Si/OH = 11 | 152 | 1 |
| F | 54 | NaF, Si/F = 44 | 151 | 1 |
| G | 54 | NaCl, Si/Cl = 2 | 200 | 1 |
| H | 54 | Na$_2$CO$_3$, Si/CO$_3$ = 11 | 152 | 1 |

TABLE 2

Sample Properties of Silicas

| Sample | Surface Area[a] | Pore Vol.[b] | Pore size[c] | % Q3 silanols |
|---|---|---|---|---|
| Reference 1[d] | 350 | 0.99 | 114 | 28 |
| Reference 2[e] | 17 | 1.3 | 2940 | 0 |
| A | 98 | 0.54 | 230 | |
| B | 51 | 0.74 | 350 | |
| C | 50 | 0.67 | 610 | |
| D | 9 | 0.59 | 3500 | 18 |
| E | 71 | 0.73 | 400 | |
| F | 43 | 0.75 | 1010 | |
| G | 39 | 0.70 | 1010 | |
| H | 29 | 0.70 | 1210 | 17 |

[a]Surface area in square meters per gram by BET measurements.
[b]Pore volume in cc per gram, determined by mercury intrusion.
[c]Average pore diameter, in angstroms by mercury intrusion for pores of diameter >300 angstroms, by nitrogen absorption for pore diameters <300 angstroms.
[d]Silica (Zorbax LP) was obtained from BTR Separations and used for hydrothermally treated silicas.
[e]Prepared by pore-filled/melt procedure of Novak and Berek, op. cit., at 800° C.

Preparation of Supports and Comparative Performance.

Different chiral stationary phases were prepared using Zorbax LP as the starting point for different silicas. Zorbax LP is an inexpensive spray dried silica that has a particle size of 50 microns and a pore size of 100A. Zorbax LP and the C18 (octadecylsilane treated) bonded Zorbax LP were obtained from BTR Separations. The pore widening treatment (Na$_2$CO$_3$/120° C.) was performed on Zorbax LP and a portion of the pore widened material was bonded with aminopropylsilane. The following descriptions are representative of the methods used for preparing chiral stationary phases.

Preparation of Aminopropylsilane-Bonded Silica Gel.

(Cf. T. Ihara et al., *J. Chrom., A*, (1995), 694, pp. 49–56). Silica gel (Zorbax LP, 35.0 grams) was dried in a vacuum oven at 120° C. for 2–3 hours. The gel was slurried in 125 mL of toluene in a 500 mL round bottom flask fitted with a Dean-Stark trap with reflux condenser, thermowell, pressure equalizing addition funnel and overhead stirrer. The mixture was heated to reflux and 25 mL of the overhead was collected in the Dean-Stark trap and drained in order to ensure that the silica was dry. Aminopropyltriethoxysilane (36 grams) was dissolved in 50 mL of toluene and added dropwise to the silica gel slurry. The mixture was heated to reflux for approximately 18 hours. The Dean Stark trap was drained twice to remove any water and ethanol that may have distilled over, and the drained volume was replaced with fresh toluene. The reaction mixture was cooled to room temperature and the product was collected on a fritted filter funnel (<5 μm) by vacuum filtration. The resulting white solid was washed successively with 3 125-mL portions of toluene, tetrahydrofuran (THF), methanol, acetone and ether. The solid was air dried for 1 hour then further dried under vacuum to a constant weight. Other bonding agents such as octadecyltriethoxysilane or phenyltriethoxysilane can be substituted for aminopropyltriethoxysilane to prepare alternate supports.

Preparation of Cellulose tris-(3,5-dimethylphenylcarbamate) [CTDPC].

Microcrystalline cellulose (Baker, 7.5 grams) was slurried with 85 mL of pyridine under a nitrogen atmosphere in a 250 mL flask fitted with overhead stirrer, thermowell, and Dean-Stark trap/reflux condenser. The mixture was heated to reflux (~104° C.) for one hour with stirring, and approximately 15 mL of overhead vapor that condensed into the Dean-Stark trap was drained and discarded. The mixture was allowed to cool to less than 40° C. The Dean-Stark trap was removed and a dry pressure-equalizing addition funnel was installed to the reaction set-up. A solution of 25.0 grams of 3,5-dimethylphenylisocyanate (0.17 mole) in 30 mL of pyridine was charged to the addition funnel. The reaction mixture was heated to approximately 90°–95° C. and the isocyanate solution was added to the cellulose slurry dropwise over 2 hours. The addition funnel was rinsed with 5 mL of pyridine and the rinsings were added to the reaction mixture. After the addition was complete the reaction mixture was stirred for an additional 18 hours. The reaction mixture, a dark amber viscous, mostly homogeneous liquid, was cooled to room temperature. The product was poured into 350 mL of vigorously stirred methanol, the reaction flask was rinsed with an additional 150 mL of methanol and the combined methanol fractions were stirred for 1 hour. The resulting white solid was collected by vacuum filtration and rinsed with 250 mL of methanol and 250 mL of hexane. The product was dried in air, then under vacuum to a constant weight.

Procedure for coating CTDPC on silica.

Cellulose tris-(3,5-dimethylphenylcarbamate) (4 g) was combined with 65 mL HPLC grade (no inhibitors) tetrahydrofuran in a round-bottomed flask equipped with a magnetic stirrer and stirred until the CTDPC was dissolved. One half of this mixture was removed from the flask. 16 g of aminopropylsilylated silica (dried at 120° C. for 2 hours under vacuum) was added to the flask and stirred for 3 hours. The majority of the THF was removed by rotary evaporation. The remaining CTDPC/THF mixture was added to the flask and stirred for 1 hour. The THF was again removed by rotary evaporation, but this process was interrupted several times to break up any large clumps with a spatula. The flask contents were not taken to complete dryness. The CTDPC coated silica was then gently ground using a mortar and pestle to separate the spherical silica particles without breaking them up. The coated silica was then dried under vacuum at ambient temperature overnight.

The materials are summarized below in Table 3. CSPs were targeted at carbon content of 5 and 12% (as a measure of CTDPC loading).

TABLE 3

Summary of Silica Supports

| Material | Description | C/H/N |
|---|---|---|
| Zorbax C18 | Zorbax LP bonded with C18 (100 Å) | 28.7/4.4/1.5 |
| Zorbax/Hydro | Zorbax LP treated with Na$_2$CO$_3$/150° C. (1,000 Å) | 12.4/1.7/1.3 |
|  | Zorbax LP treated with Na$_2$CO$_3$/150° C. (1,000 Å) | 5/1/0.58 |
| Zorbax LP | bare silica (100 Å) | 15/2.3/1.4 |
| Zorbax/Hydro/APS 5% C | Zorbax LP treated with Na$_2$CO$_3$/150° C. (1,000 Å); bonded with APS | 5.5/0.98/0.8 |
| Zorbax/Hydro/APS 12% C |  | 12.9/1.7/1.5 |

The coated materials were then slurry packed (generally in a 2 propanol/hexane mixture) in columns (25 cm long×1 cm ID) and tested with a variety of racemates. Typical test conditions include a flow rate of 4.7 mL/min and a mobile phase of 90/10 vol-% hexane/IPA. Tri-t-butybenzene (TTBB) was used as the tracer. The HPLC results with a neutral racemate such as 9-MAC [2,2,2 trifluoromethyl-1-(9-anthryl) ethanol] are shown below. The stage time is an important performance parameter for a CSP. Stage time is derived from moments analysis and is a combination of mass transfer resistance and axial dispersion effects. For a series of materials with identical particle size, the lowest stage time indicates the best performance. The C18 material had the highest stage time which is consistent with the reduced pore volume of the bonded silica. When the pores are widened with a hydrothermal treatment the stage times are reduced. Bonding the residual silanols with aminopropyl silane further reduces the stage time. These results indicate that the pore widened silica is a superior support for a cellulose CSP.

TABLE 4

Summary of HPLC Results with 9-MAC

| Material | k'1 R(−) | k'2 S(+) | Alpha | Resolution. |
|---|---|---|---|---|
| Chiralcel OD[1] | 1.69 | 5.28 | 3.13 |  |
| Chiralcel OD | 2.22 | 6.76 | 3.05 | 3.13 |
| Zorbax LP | 0.85 | 2.36 | 2.78 | 1.01 |
| Zorbax C18[2] | 2.08 | 7.08 | 3.41 | 1.31 |
| Zorbax/Hydro 12% C[3] | 1.27 | 3.96 | 3.12 | 1.00 |
| Zorbax/Hydro 5% C[4] | 0.47 | 1.54 | 3.28 | 1.35 |
| Zorbax/Hydro/APS 12% C[5] | 1.93 | 5.14 | 2.66 | 1.41 |
| Zorbax/Hydro/APS 5% C[6] | 1.11 | 2.29 | 2.07 | 1.17 |

[1]Commercial CSP from Daicel, ltd.
[2]CSP is Zorbax LP treated with octadecylsilane, then coated with CTDPC at 8.7%.
[3]CSP is Zorbax LP, hydrothermally treated, then coated with CTDPC to final level of 12% carbon.
[4]Like 3, but 5% carbon.
[5]Like 3, but treated with aminopropylsilane prior to being coated with CTDPC.
[6]Like 5, but 5% carbon.

The CSP prepared from a C18 Zorbax LP has the highest selectivity for 9- MAC. The high selectivity could be a function of surface chemistry where the octadecylsilane is preferred to the aminopropylsilane. The CSP's prepared with a lower cellulose loading of 5 wt.% carbon have a higher plate count and shorter retention times than the materials with a higher cellulose loading.

Results with t-stilbene oxide are shown below. Once again, the CSP prepared with a silica bonded with octadecylsilane performs well.

TABLE 5

Summary of HPLC Results with t-Stilbene Oxide

| Material | k'1 | k'2 | Alpha |
| --- | --- | --- | --- |
| Zorbax LP | 0.34 | 0.72 | 2.10 |
| Zorbax C18 | 0.95 | 2.15 | 2.26 |
| Zorbax/Hydro | 0.56 | 1.18 | 2.11 |
| Zorbax/Hydro/5% C | 0.18 | 0.45 | 2.44 |
| Zorbax/Hydro/APS/12% C | 0.55 | 1.20 | 2.21 |
| Zorbax/Hydro/APS/5% C | 0.21 | 0.47 | 2.22 |

With basic analytes such as propranolol, the surface chemistry of the support is important. Residual silanols on the silica surface interact strongly with basic compounds and propranolol was not recovered when Zorbax LP was the support. With Zorbax C18 as the support propranolol was strongly adsorbed and was eluted with a stronger mobile phase. The pore widened material that was bonded with aminopropylsilane performed well with propranolol.

TABLE 6

Summary of HPLC Results with Propranolol

| Material | k'1 | k'2 | Alpha |
| --- | --- | --- | --- |
| Zorbax LP | — | — | — |
| Zorbax C18 | — | — | — |
| Zorbax/Hydro | 6.55 | | |
| Zorbax/Hydro/5% C | 3.15 | 3.78 | 1.2 |
| Zorbax/Hydro/APS/12% C | 1.96 | 4.10 | 2.09 |
| Zorbax/Hydro/APS/5% C | 0.78 | 1.76 | 2.25 |

In conclusion, the results described above indicate that the CSP prepared with the pore widened Zorbax LP silica performs well with neutral racemates. Bonding of surface silanols with a silane prior to coating with CTDPC is necessary for use with basic racemates.

What is claimed is:

1. A chiral stationary phase comprising a chiral organic material deposited on an amorphous, large pore silica of surface area less than about 30 meters per square gram ($m^2/g$) and having a unimodal pore size distribution with median pore size in the range of 300 to about 25,000 angstroms, at least about 10% of Q3 silanols as measured by nuclear magnetic resonance spectroscopy, and less than about 0.5% of Q2 silanols as measured by nuclear magnetic resonance spectroscopy.

2. The chiral stationary phase of claim 1 where the median pore size is about 1000 Å.

3. The chiral stationary phase of claim 1 having at least about 13% of Q3 silanols as measured by nuclear magnetic resonance spectroscopy.

4. The chiral stationary phase of claim 1 where the median pore size is in the range 800–10,000 angstroms.

5. The chiral stationary phase of claim 1 where the chiral organic material is selected from the group consisting of polysaccharide esters and polysaccharide carbamates.

6. A method of preparing a chiral stationary phase comprising impregnating an amorphous, large pore silica of surface area less than about 30 meters per square gram ($m^2/g$) and having a unimodal pore size distribution with a median pore size in the range of 300 to about 25,000 angstroms, with a chiral organic material, said amorphous large pore silica prepared by contacting a suspension of silica with a mineralizing agent at a temperature between about 85° and about 300° C. for a time between about 4 hours to about 10 days, and recovering the large pore silica produced thereby.

7. The method of claim 6 where the mineralizing agent is selected from the group consisting of (1) compounds having anions of hydroxide, carbonate, or fluoride, and (2) catechol.

8. The method of claim 6 where the chiral organic material is selected from the group consisting of polysaccharide esters and polysaccharide carbamates.

* * * * *

UNITED STATES PATENT AND TRADEMARK OFFICE
CERTIFICATE OF CORRECTION

PATENT NO: 5,888,927
DATED: Mar. 30, 1999
INVENTORS: McCulloch et al.

It is certified that error appears in the above-identified patent and that said Letters Patent is hereby corrected as shown below:

On the title page: Item [73]

The Assignee should be corrected to show, "UOP LLC, Des Plaines, Ill."

Signed and Sealed this

Twenty-ninth Day of February, 2000

*Attest:*

Q. TODD DICKINSON

*Attesting Officer*     *Commissioner of Patents and Trademarks*